June 8, 1965  B. ERIKSSON  3,188,177
METHOD FOR COOLING A CIRCULATING GAS IN A
PLANT FOR ENRICHMENT OF HEAVY WATER
Filed March 31, 1959  3 Sheets-Sheet 1

INVENTOR.
Bengt Eriksson
BY
Attorney.

United States Patent Office 3,188,177
Patented June 8, 1965

3,188,177
METHOD FOR COOLING A CIRCULATING GAS IN A PLANT FOR ENRICHMENT OF HEAVY WATER
Bengt Eriksson, Vasteras, Sweden, assignor, by mesne assignments, to Aktiebolaget Atomenergi, Stockholm, Sweden
Filed Mar. 31, 1959, Ser. No. 803,272
Claims priority, application Sweden, Apr. 16, 1958, 3,685/58
6 Claims. (Cl. 23—204)

This invention relates to a method for cooling a gas which circulates in a set-up for enrichment of heavy water by isotope exchange between the gas and water in two parts of the set-up, working at different temperatures.

For a better understanding of the problems, the solution of which is object of this invention reference is made to the drawings, in which.

Figure 1:
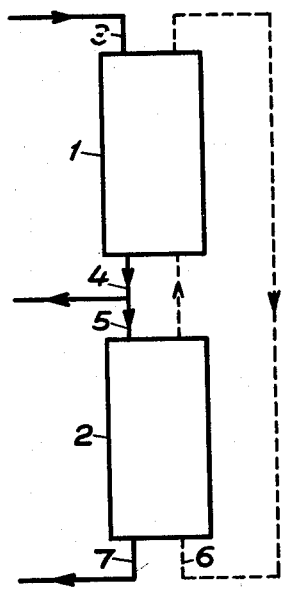
FIGURE 1 is a diagrammatic side elevational view of a unit for manufacturing water enriched with heavy water.

The heavier forms of water, HDO and $D_2O$, can be enriched in relation to the usual form, $H_2O$, by a so-called two temperature stage process comprising isotope exchange between e.g. hydrogen sulphide and water at two different temperatures. A unit for manufacturing enriched water according to the method mentioned is schematically illustrated in FIGURE 1 of the accompanying drawing. The unit which works under pressure comprises in the main two enrichment parts comprising one tower 1, working at a low temperature and one tower 2, working at a higher temperature, or a group of towers connected in parallel and working at a low temperature and a group of towers, also connected in parallel and working at a higher temperature. The path of the water through the unit is marked out in continuous lines and that of the hydrogen sulphide in lines of short dashes. The equilibrium constant, $\alpha$, of the reaction between water, $H_2O$, and hydrogen sulphide, $H_2S$, and the simple deuterium forms of these compounds, HDO and HDS respectively, is defined by the expression:

$$\alpha = \frac{(HDO)(H_2S)}{(H_2O)(HDS)}$$

This constant has a higher value at a low temperature, e.g. 2, 3 at 30° C. than at a higher temperature, e.g. 1, 9 at 100° C. When water is fed to the top of the cold tower at 3 and is met from below by hydrogen sulphide, which in the warm tower has been enriched with HDS, an exchange reaction takes place, which leads to the water supplied being enriched with HDO in such a way that some deuterium passes from the hydrogen sulphide to the water. A part of the water, enriched with heavy water, which leaves the cold tower, is withdrawn from the unit as product water at 4, while the principal part flows to the top of the warm tower at 5, where the water meets a stream of hydrogen sulphide, coming from below. Before it enters the bottom 6 of the warm tower, this hydrogen sulphide comes from the cold tower, where it has transmitted a part of its content of deuterium. As the equilibrium constant has a lower value at the temperature prevailing in the warm tower, deuterium will here pass from the enriched water to the hydrogen sulphide, which in that way will be enriched with HDS at the same time as the content of heavy water in the water falls. By supplying a suitable amount of natural water at the top of the cold tower and taking out a suitable amount of the enriched product at its bottom under carefully controlled conditions it is possible to obtain an equilibrium in the system at which state the content of heavy water in the warm water, leaving the unit at 7 is lower than the content of the water having been supplied at the top of the cold tower. The result of the process is that the water supplied to the unit is removed from the system after having transmitted a part of its content of heavy water, while the hydrogen sulphide is permanently circulating. The transport of the water through the plant is usually performed by pumps and the transport of the hydrogen sulphide by blowers, inserted in the circulating systems of water and hydrogen sulphide respectively. In the systems there are also heating and cooling means in which the water and the hydrogen sulphide reach the temperatures prevailing in the towers, before they are introduced into these towers. The water supplied to the cold tower can be either natural water or already enriched water.

With enrichment of heavy water according to the described method, after having left the top of the warm tower the gas has to be cooled before being introduced into the bottom of the cold tower.

Figure 2:
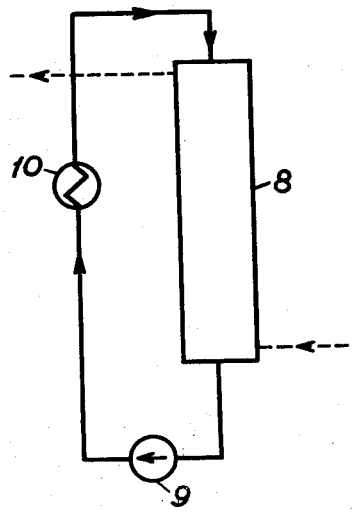
FIGURE 2 is a diagrammatic side elevational view of a cooling arrangement for the circulating gas.

The cooling of the gas can be performed according to FIGURE 2 in such a way that the gas in a counter-current heat exchange tower 8 is brought into direct contact with a cold water stream which, in a system containing a pump 9 and an indirect cooling means 10 situated outside the tower, circulates round the tower. Besides the circulating water the top of the tower may also be supplied with water from the cold enrichment tower. The temperature of the cold enrichment tower is influenced by the temperature of the gas leaving the counter-current heat exchange tower and so by the temperature of the circulating water cooled in means 10, which circulating water is supplied to the top of the last mentioned tower. The temperature of the cooled water is, in its turn, dependent on the temperature of the water which is used as cooling medium on the secondary side of the cooling means 10. Thus one of the limiting factors when reducing temperature of the cold enrichment tower is the temperature of the water used as cooling medium on the secondary side of the cooling means 10. For the economy of the process it is essential that the temperature of the cold enrichment tower is kept low as the yield in the set-up is dependent upon the temperature difference between the cold and the warm enrichment tower and because of the great costs for heating the gas as well as the water supplied to the last mentioned tower it is important, in order to obtain a desired temperature difference, to keep the temperature of the warm enrichment tower as low as possible. However, the water which enters the top of the counter-current heat exchange tower via the cooling means 10 is far from saturated with the gas, as the water has been saturated at a higher temperature, i.e. at that prevailing in the bottom of the heat exchange tower, and through the following cooling has a greater solubility for the gas. At its entrance into the top of the heat exchange tower, therefore, the water absorbs considerable quantities of gas and as this gas absorption for the system hydrogen sulphide-water, among others, results in heating, the temperature of the water in the top of the tower, and consequently the temperature of the gas leaving the tower, will be higher than the temperature to which the water has been cooled in the cooling means 10.

It is an object of this invention to prevent an undesirable evolution of heat when cooling a gas which circulates in a plant for enrichment of heavy water by isotope exchange between the gas and water at two different temperatures, the cooling being performed by a cold water stream in counter-current direct contact with the gas, such undesirable evolution of heat being caused by the streaming water absorbing gas.

Another object of the invention is, at a desired temperature difference between the warm and cold enrichment tower of a plant for manufacturing heavy water, to keep the warm tower at a temperature as low as is practically possible.

Another object of the invention is to supply the warm counter-current contact with the circulating gas, whereby the streaming water flows in steady circulation in such a way that after having been heated by the circulating gas it is brought from the circulating gas and cooled in the presence of supplied gas of the same kind as the circulating gas, after which it is again brought into contact with the circulating gas for cooling. In order to get the best possible result it is necessary that the amount of the supplied gas is sufficient to saturate the cooled water. By using the method according to the invention for cooling the circulating gas an absorption of gas with an accompanying evolution of heat in the cooled water at its entrance into the top of the heat exchange tower is prevented and the temperature of the gas leaving the tower can consequently be kept low, and also, therefore, that of the cold enrichment tower to which the gas is led.

Figure 3:
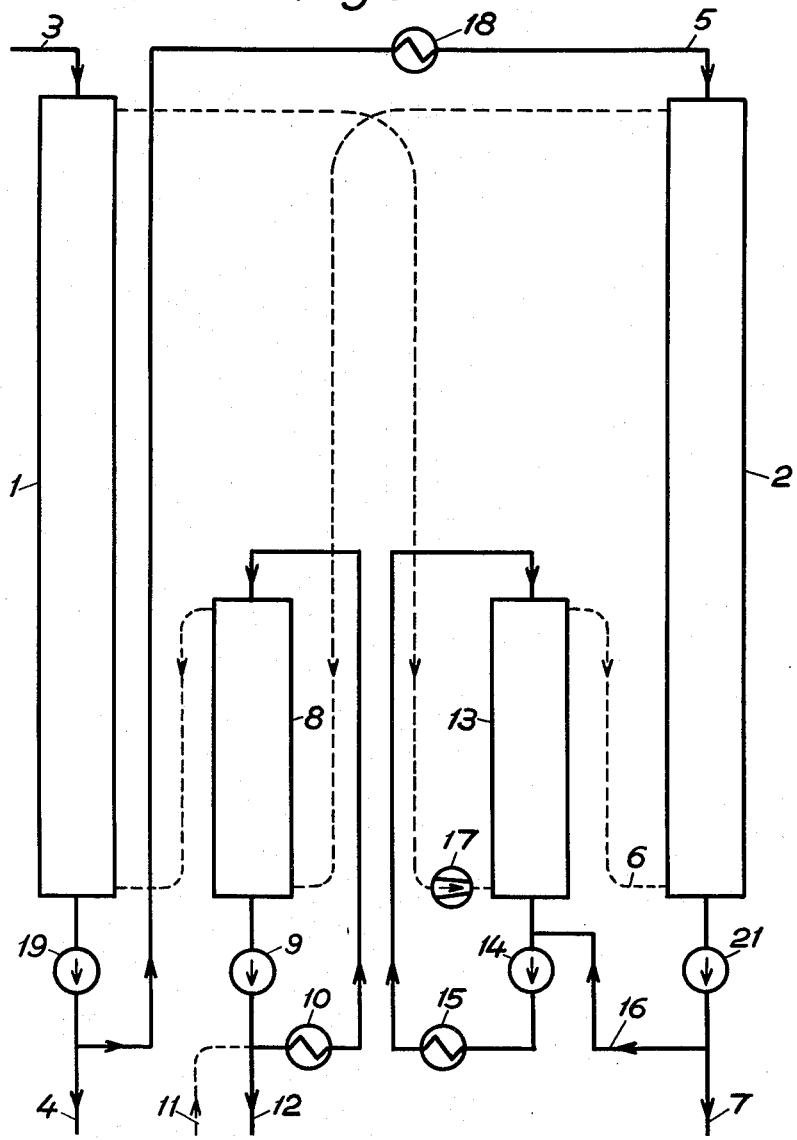
FIGURE 3 is a diagrammatic side elevational view, showing a unit suitable when using the method according to the invention.
Figure 4:
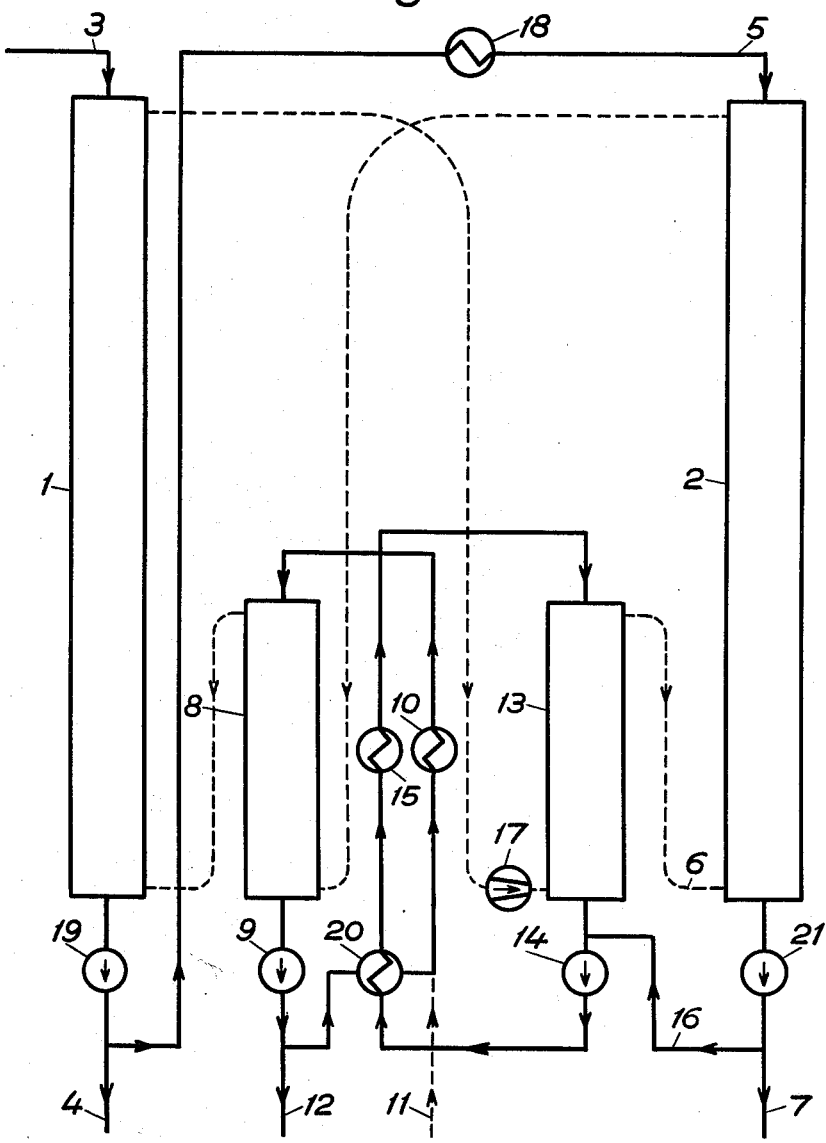
FIGURE 4 is a similar diagrammatic side elevational view, showing another unit suitable when using the method according to the invention.

The scope of the invention will be more readily apparent by reference to the following description when taken in conjunction with the accompanying illustrations, FIGURES 3 and 4 in which:

FIGURE 3 is a diagrammatic side elevational view, showing a unit suitable when using the method according to the invention, FIGURE 4 is a similar diagrammatic side elevational view, showing another unit suitable when using the method according to the invention.

In the figures the path of the gas is marked out in lines of short dashes and the path of the circulating water for cooling the gas, and that of the process water, in continuous lines. In the counter-current heat exchange tower 8 for cooling the circulating gas, the gas from the counter-current processing warm enrichment tower 2 meets a cold water stream which cools the gas to the requisite extent before it is supplied to the counter-current processing cold enrichment tower 1. The water stream is itself thereby heated. Before the water stream is again forced by the pump 9 to the top of the gas cooling tower, it is cooled in a conventional indirect heat exchanger 10, working with cooling water, in which the water has been supplied at 11 with gas of the same kind as the gas circulating in the plant. This gas may be taken, via a compressor, from a suitable point in the gas circulating system of the enrichment unit. The gas quantity can suitably be great enough for the water, after the cooling, to be saturated with the gas so that on entering the gas cooling tower the water is not heated by gas dissolving in it. When cooling the circulating gas in the gas cooling tower some water vapour will condense. An amount of water corresponding to the condensate amount has, therefore, to be taken away from the tower, and in the figure this is represented by the water stream 12. The heating of the gas, before it is introduced in the counter-current processing warm enrichment tower can also take place in a counter-current heat exchange tower 13, in which the cold gas meets a warm water stream flowing downwards which, on the one hand, heats the gas to the desired temperature and on the other hand, saturates it with water vapour. The water stream, which is then cooled, before it is again led to the top of the gas heating tower by the pump 14, is heated in a conventional indirect heat exchanger 15, working with water vapour. As some water leaves the gas heating tower together with the escaping gas, water has to be supplied to the tower, and in the figure this is represented by the water stream 16. It is not necessary to use a heat exchange tower. The gas heating can also be performed in a conventional heat exchanger, combined with a means for saturating the circulating gas with water vapour. The circulation of the gas is performed by a blower 17. The process water is supplied to the top of the counter-current processing cold enrichment tower 1, is led from its bottom after a part of the water enriched with heavy water has been withdrawn as product water at 4, via a heating means 18 by a pump 19 to the top of the counter-current processing warm enrichment tower 2 and is withdrawn from the unit at the bottom of the warm enrichment tower by a pump 21. The temperature of the cold enrichment tower can be e.g. 30° C. and that of the warm enrichment tower e.g. 130° C. The pressure in the enrichment unit can be 20 kp./cm.$^2$.

The method of operation of the unit in FIGURE 4 differs from that of the unit in FIGURE 3 in that the circulating water streams for cooling and heating the circulating gas are brought to exchange heat with each other during their circulating through and round the gas cooling tower 8 and the gas heating tower 13 respectively. Instead of, as in the unit in FIGURE 3, the cooling water stream being only cooled in the heat exchanger 10, and the heating water stream being only heated in the heat exchanger 15, the cooling water stream and the heating water stream are, in the unit in FIGURE 4, first brought to exchange heat with each other in indirect contact in a heat exchanger 20, before the cooling water stream is supplied at 11 with gas of the same kind as the circulating gas and then cooled in the heat exchanger 10 and before the heating water stream is heated in the heat exchanger 15. Otherwise, the unit in FIGURE 4 corresponds to that in FIGURE 3. Other arrangements as well as the method of circulating the gas and the water are the same.

Conduits for gas and water, which are of conventional type, are represented by the continuous and dashed lines showing the paths of gas and water.

Especially if the cold enrichment part of the unit comprises towers connected in parallel, the cooling of the circulating gas can take place in more than one counter-current heat exchange tower. The water streams then circulating through and round the gas cooling towers are, in the above described manner, supplied with gas before or in connection with being cooled in cooling means placed outside the towers.

Instead of the gas hydrogen sulphide, mentioned earlier, other gases can also be used advantageously for enrichment of heavy water by use of the method according to the invention.

I claim:

1. In the process of producing water containing deuterium concentrated therein by exchanging, at two different temperatures, hydrogen with deuterium between water and hydrogen sulphide, the steps comprising: establishing a countercurrent flow of the water and the hydrogen sulphide in an exchange unit comprising at least one first and at least one second exchange vessel by introducing a first stream of water into the first exchange vessel of the unit and passing the first stream of water therethrough, introducing a portion of the first stream of water passed through the first exchange vessel of the unit into the second exchange vessel of the unit and passing the portion of the first stream of water therethrough, and introducing the hydrogen sulphide into the second exchange vessel of the unit and passing the hydrogen sulphide therethrough, introducing the hydrogen sulphide passed through the second exchange vessel of the unit into the first exchange vessel of the unit and passing the hydrogen sulphide therethrough, whereby the water of the first stream and the hydrogen sulphide are mixed in each of said exchange vessels to cause an exchange of deuterium with hydrogen between them; maintaining the first exchange vessel of the unit at a temperature to cause the first stream of water flowing therethrough to become enriched and the hydrogen sulphide flowing therethrough to become impoverished with respect to deuterium; maintaining the second exchange vessel of the unit at a temperature to cause the hydrogen sulphide flowing therethrough to become enriched and the first stream of water flowing therethrough to become impoverished with respect to deuterium; withdrawing as product a portion of the first stream of water passed through the first exchange vessel of the unit and containing deuterium concentrated therein before at least the principal part of the remaining portion of the first stream of water is introduced into the second exchange vessel of the unit; cooling the hydrogen sulphide before it is introduced into the first exchange vessel of the unit by bringing it in countercurrent direct contact in an exchanger with a second stream of water which, at its entrance to the exchanger, is substantially saturated with hydrogen sulphide, withdrawing the second stream of water from the exchanger, supplying the second stream of water after it leaves the exchanger with added hydrogen sulphide, returning the second stream of water to the exchanger for repeated countercurrent direct contact with the hydrogen sulphide led therethrough, and cooling the second stream of water in the presence of the added hydrogen sulphide before it reenters the exchanger, whereby to saturate said second stream of water with hydrogen sulphide.

2. In the process of producing water containing deuterium concentrated therein by exchanging, at two different temperatures, hydrogen with deuterium between water and a gas capable of containing each of hydrogen and deuterium, the steps comprising: establishing a countercurrent flow of the water and the gas in an exchange unit comprising at least one first and at least one second exchange vessel by introducing a first stream of water into the first exchange vessel of the unit and passing the first stream of water therethrough, introducing a portion of the first stream of water passed through the first exchange vessel of the unit into the second exchange vessel of the unit and passing the portion of first stream of water therethrough, and by introducing the gas into the second exchange vessel of the unit and passing the gas therethrough, introducing the gas passed through the second exchange vessel of the unit into the first exchange vessel of the unit and passing the gas therethrough, whereby the water of the first stream and the gas are mixed in each of the said exchange vessels to cause an exchange of deuterium with hydrogen between them; maintaining the first exchange vessel of the unit at a temperature to cause the first stream of water flowing therethrough to become enriched and the gas flowing therethrough to become impoverished with respect to deuterium; maintaining the second exchange vessel of the unit at a temperature to cause the gas flowing therethrough to become enriched and the first stream of water flowing therethrough to become impoverished with respect to deuterium; withdrawing as product a portion of the first stream of water passed through the first exchange vessel of the unit and containing deuterium concentrated therein before at least the principal part of the remaining portion of the first stream of water is introduced into the second exchange vessel of the unit; cooling the gas before it is introduced into the first exchange vessel of the unit by bringing it in countercurrent direct contact in an exchanger with a second stream of water which, at its entrance to the exchanger, is substantially saturated with a gas of the same kind as that led through the exchange unit, withdrawing the second stream of water from the exchanger, supplying the second stream of water after it leaves the exchanger with added gas of the same kind as that led to the exchange unit, returning the second stream of water to the exchanger for repeated countercurrent direct contact with the gas led therethrough, and cooling the second stream of water in the presence of the added gas before it reenters the exchanger, whereby to saturate said second stream of water with said gas.

3. In the process of producing water containing deuterium concentrated therein by exchanging, at two different temperatures, hydrogen with deuterium between water and hydrogen sulphide the steps comprising: establishing a countercurrent flow of a first stream of water and the hydrogen sulphide in direct contact with each other in an exchange unit comprising at least one first and at least one second exchange vessel to cause an exchange of hydrogen with deuterium between the first stream of water and the hydrogen sulphide in each of the exchange vessels; maintaining the first exchange vessel of the unit at a temperature to cause the first stream of water flowing therethrough to become enriched and the hydrogen sulphide flowing therethrough to become impoverished with respect to deuterium; maintaining the second exchange vessel of the unit at a temperature to cause the hydrogen sulphide flowing therethrough to become enriched and the first stream of water flowing therethrough to become impoverished with respect to deuterium; withdrawing as product a portion of the first stream of water passed through the first exchange vessel of the unit and containing deuterium concentrated therein; cooling the hydrogen sulphide before it is introduced into the first exchange vessel of the unit by bringing it in countercurrent direct contact in an exchanger with a second stream of water which, at its entrance to the exchanger, is substantially saturated with hydrogen sulphide, withdrawing the second stream of water from the exchanger, supplying the second stream of water after it leaves the exchanger with added hydrogen sulphide, returning the second stream of water to the exchanger for repeated countercurrent direct contact with the hydrogen sulphide led therethrough, and cooling the second stream of water in the presence of the added hydrogen sulphide before it reenters the exchanger, whereby to saturate said second stream of water with hydrogen sulphide.

4. In the process of producing water containing deuterium concentrated therein by exchanging, at two different temperatures, hydrogen with deuterium between water, and a gas capable of containing each of hydrogen and deuterium, the steps comprising: establishing a countercurrent flow of a first stream of water and the gas in direct contact with each other in an exchange unit comprising at least one first and at least one second exchange vessel to cause an exchange of hydrogen with deuterium between the water and the gas in each of the exchange vessels; maintaining the first exchange vessel of the unit at a temperature to cause the first stream of water flowing therethrough to become enriched and the gas flowing therethrough to become impoverished with respect to deuterium; maintaining the second exchange vessel of the unit at a temperature to cause the gas flowing therethrough to become enriched and the first stream of water flowing therethrough to become impoverished with respect to deuterium; withdrawing as product a portion of the first stream of water passed through the first exchange vessel of the unit and containing deuterium concentrated therein; cooling the gas before it is introduced into the first exchange vessel of the unit by bringing it in countercurrent direct contact in an exchanger with a second stream of water which, at its entrance to the exchanger, is substantially saturated with a gas of the same kind as that led through the exchange unit, withdrawing the second stream of water from the exchanger, supplying the second stream of water after it leaves the exchanger with added gas of the same kind as that led to the exchange unit, returning the second stream of water to the exchanger for repeated countercurrent direct contact with the gas led therethrough, and cooling the second stream of water in the presence of the added gas before it reenters the exchanger, whereby to saturate said second stream of water with said gas.

5. In the process of producing water containing deuterium concentrated therein by exchanging, at two different temperatures, hydrogen with deuterium between water and hydrogen sulphide, the steps comprising: establishing a countercurrent flow of a first stream of and hydrogen sulphide in direct contact with each other in at least one first exchange vessel; establishing a countercurrent flow of said first stream of and hydrogen sulphide in direct contact with each other in at least one second exchange vessel; maintaining the first exchange vessel at a temperature to cause the first stream of water flowing therethrough to become enriched and the hydrogen sulphide flowing therethrough to become impoverished with respect to deuterium; maintaining the second exchange vessel at a temperature to cause the hydrogen sulphide flowing therethrough to become enriched and the first stream of water flowing therethrough to become impoverished with respect to deuterium; withdrawing as product a portion of the first stream of water passed through the first exchange vessel and containing deuterium concentrated therein; cooling the hydrogen sulphide before it is introduced into the first exchange vessel of the unit by bringing it in countercurrent direct contact in an exchanger with a second stream of water which, at its entrance to the exchanger, is substantially saturated with hydrogen sulphide, withdrawing the second stream of water from the exchanger, supplying the second stream of water after it leaves the exchanger with added hydrogen sulphide, returning the second stream of water to the exchanger for repeated countercurrent direct contact with the hydrogen sulphide led therethrough, and cooling the second stream of water in the presence of the added hydrogen sulphide before it reenters the exchanger, whereby to saturate said second stream of water with hydrogen sulphide.

6. In the process of producing water containing deuterium concentrated therein by exchanging, at two different temperatures, hydrogen with deuterium between water and a gas capable of containing each of hydrogen and deuterium, the steps comprising: establishing a countercurrent flow of a first stream of and the gas in direct contact with each other in at least one first exchange vessel; establishing a countercurrent flow of said first stream of and the gas in direct contact with each other in at least one second exchange vessel; maintaining the first exchange vessel at a temperature to cause the first stream of water flowing therethrough to become enriched and the gas flowing therethrough to become impoverished with respect to deuterium; maintaining the second exchange vessel at a temperature to cause the gas flowing therethrough to become enriched and the first stream of water flowing therethrough to become impoverished with respect to deuterium; withdrawing as product a portion of the first stream of water passed through the first exchange vessel and containing deuterium concentrated therein; cooling the gas before it is introduced into the first exchange vessel of the unit by bringing it in countercurrent direct contact in an exchanger with a second stream of water which, at its entrance to the exchanger, is substantially saturated with a gas of the same kind as that led through the exchange unit, withdrawing the second stream of water from the exchanger, supplying the second stream of water after it leaves the exchanger with added gas of the same kind as that led to the exchange unit, returning the second stream of water to the exchanger for repeated countercurrent direct contact with the gas led therethrough, and cooling the second stream of water in the presence of the added gas before it reenters the exchanger, whereby to saturate said second stream of water with said gas.

References Cited by the Examiner

UNITED STATES PATENTS

| 2,420,993 | 5/47 | Kelley | 261—11 X |
| 2,557,204 | 6/51 | Richardson | 261—11 X |
| 2,895,803 | 7/59 | Spevack | 23—203 |

FOREIGN PATENTS 229,285  1/44  Switzerland.

MAURICE A. BRINDISI, *Primary Examiner.*

HERBERT L. MARTIN, *Examiner.*